United States Patent
Meghanathan et al.

(10) Patent No.: US 11,141,678 B2
(45) Date of Patent: Oct. 12, 2021

(54) INDUSTRIAL WASTEWATER RECOVERY APPARATUS AIMING AT ZERO LIQUID DISCHARGE (ZLD)

(71) Applicants: Dharmendra Meghanathan, Bangalore (IN); Sujay Elangovan, Bangalore (IN)

(72) Inventors: Dharmendra Meghanathan, Bangalore (IN); Sujay Elangovan, Bangalore (IN)

(73) Assignee: Dharmendra Meghanathan, Bangalore (IN)

( * ) Notice: Subject to any disclaimer, the term of this patent is extended or adjusted under 35 U.S.C. 154(b) by 23 days.

(21) Appl. No.: 16/482,921

(22) PCT Filed: Feb. 2, 2018

(86) PCT No.: PCT/IB2018/050660
§ 371 (c)(1),
(2) Date: Aug. 1, 2019

(87) PCT Pub. No.: WO2018/142332
PCT Pub. Date: Aug. 9, 2018

(65) Prior Publication Data
US 2020/0009471 A1     Jan. 9, 2020

(30) Foreign Application Priority Data
Feb. 3, 2017   (IN) .............................. 201741004001

(51) Int. Cl.
*B01D 3/42*    (2006.01)
*B01B 1/04*    (2006.01)
(Continued)

(52) U.S. Cl.
CPC .................. *B01D 3/42* (2013.01); *B01B 1/04* (2013.01); *B01D 1/0058* (2013.01);
(Continued)

(58) Field of Classification Search
None
See application file for complete search history.

(56) References Cited

U.S. PATENT DOCUMENTS 4,894,123 A * 1/1990 Helmich .............. B01D 1/0082
  137/403
5,512,142 A * 4/1996 Hoiss ..................... C02F 1/043
  203/10
(Continued)

FOREIGN PATENT DOCUMENTS

DE          3214647    * 10/1983  .......... B01D 1/2812

*Primary Examiner* — Derek N Mueller
(74) *Attorney, Agent, or Firm* — David G. Rosenbaum; Rosenbaum IP

(57) ABSTRACT

The present invention provides an industrial wastewater recovery apparatus (100) aiming at Zero Liquid Discharge (ZLD). The apparatus (100) provides two stages in pre-heating the spiral coil pipe (103) containing wastewater and also conserves the heat by using the two heat exchangers (104, 105). The apparatus (100) agitates the surface wastewater to increase the rate of evaporation for faster heating. The apparatus (100) provides two stages in condensation of distilled water and also provides real-time monitoring of the water quality. The apparatus (100) provides automatic cleaning in the various parts during the operations. Further, a plurality of IoT sensor (201) monitor the real time parameters of the industrial wastewater recovery apparatus (100) and data is available to the user on the electronic display device (204).

10 Claims, 2 Drawing Sheets

(51) Int. Cl.
*B01D 1/00* (2006.01)
*B01D 1/02* (2006.01)
*B01D 1/06* (2006.01)
*B01D 1/28* (2006.01)
*B01D 5/00* (2006.01)
*B01D 17/02* (2006.01)
*C02F 1/00* (2006.01)
*C02F 1/04* (2006.01)
*C02F 101/32* (2006.01)

(52) U.S. Cl.
CPC ............ *B01D 1/0082* (2013.01); *B01D 1/02* (2013.01); *B01D 1/06* (2013.01); *B01D 1/2887* (2013.01); *B01D 1/2896* (2013.01); *B01D 5/006* (2013.01); *B01D 17/02* (2013.01); *C02F 1/004* (2013.01); *C02F 1/041* (2013.01); *C02F 1/043* (2013.01); *C02F 1/048* (2013.01); *C02F 2101/32* (2013.01); *C02F 2201/005* (2013.01); *C02F 2209/02* (2013.01); *C02F 2209/42* (2013.01); *C02F 2303/10* (2013.01); *C02F 2303/12* (2013.01)

(56) References Cited

U.S. PATENT DOCUMENTS

2011/0265474 A1* 11/2011 Schubert ................ F01K 9/003
60/641.9
2013/0186740 A1* 7/2013 Midttun ............... B01D 5/0087
203/10

* cited by examiner

INDUSTRIAL WASTEWATER RECOVERY APPARATUS AIMING AT ZERO LIQUID DISCHARGE (ZLD)

CROSS REFERENCE TO RELATED APPLICATIONS

The present application claims priority to PCT application serial no. PCT/IB2018/050660, filed Feb. 2, 2018, which claims priority to Indian patent application serial no. 201741004001, filed Feb. 3, 2017, each herein incorporated by reference in their entireties.

DESCRIPTION OF THE INVENTION

Technical Field of the Invention

The present invention relates to an apparatus to treat industrial wastewater, which aims at recovering Zero Liquid Discharge (ZLD). More particularly, the apparatus monitors the water quality on real-time basis and also provides automatic cleaning. Further, the process parameter data is obtained real-time through an IoT monitoring system. Any abnormality in operating conditions is detected and an alert is sent to an electronic display device/smartphone.

BACKGROUND OF THE INVENTION

In large-scale industries, the substantial amount of water gets polluted during the operations. In industrial wastewater treatment, there is an ever-increasing need to remove undesirable and toxic contaminants, such as bacteria and chemicals from the wastewater. The treated water is used for the development of landscape and industrial cooling purpose. The waste water from the industries is often treated to neutralize the excessive acidity or alkalinity before passing into the river, lake or ocean. The quantity of pollutants in waste water is commonly determined by measuring the amount of dissolved oxygen required to biologically decompose the waste organic matter in the polluted water. Recent developments in wastewater recovery management have led to the development of an apparatus to treat industrial wastewater. The apparatus efficiently reduces the biochemical oxygen demand and chemical oxygen demand in the waste water. The apparatus separates the organic and inorganic substances from the industrial wastewater.

Various types of conventional systems and apparatuses to treat wastewater are known in the prior art. The United States Patent document U.S. Pat. No. 3,912,578A describes an apparatus for and a method of purifying waste fluid. In the cited document, apparatus purifies the waste fluid containing waste water and corrosive salts. The apparatus produces substantially pure salt-free condensate water.

The United States Patent document U.S. Pat. No. 6,890,429B2 describes the systems and methods for treating waste water. In the cited document, the system treats the waste water containing biological wastes such as animal waste generated in livestock-raising operations. The waste water is subjected to a series of operations to separate solids from the liquid phase of the waste water and to biologically treat the waste water to break down organic components. The separated solids are stored for further treatment or conversion into useful materials. The treated liquid phase can be put to various uses. In one embodiment, the treated liquid is recycled as flush water for flushing animal waste from an animal barn, whereby little or no liquid phase escapes the system into the surrounding environment.

The United States Patent document U.S. Pat. No. 9,429,317B2 describes a wastewater evaporation apparatus and method. In the cited document, the method evaporates a liquid and incinerating pollutants present in the resulting vapor. The system includes a chamber for containing a liquid and a floatable pan in the chamber. A portion of the liquid enters into a basin of the pan and a heating element. The liquid in the basin of the pan for evaporating the liquid, and a blowing burner to incinerate pollutants present in the evaporated liquid.

Typically, the conventional systems do not use two stages of pre-heating process to treat the industrial waste-water and also do not use agitators to increase the evaporation rate for faster heating. Convention systems do not use two stages in condensation of distilled water. Typically, the system does not facilitate the real-time monitoring of the water quality.

In a conventional system of waste water recovery, most of the processes are monitored by manually. They do not had any automatic monitoring system using IoT sensors. This makes a lot of complexity in monitoring the waste water recovery apparatus. Thus, more manpower requirement for monitoring the apparatus.

Hence, there is a need for an apparatus to treat industrial wastewater, which aims at recovering Zero Liquid Discharge (ZLD) in an efficient manner.

SUMMARY OF THE INVENTION

The present invention overcomes the drawbacks in the prior art and provides an apparatus involved in recovering industrial wastewater in an efficient and precise manner.

The apparatus for industrial waste water recovery aiming at Zero Liquid Discharge (ZLD), the apparatus comprises a first storage tank configured to allow the flow of industrial wastewater through a spiral coil pipe towards the vertical tubes of the evaporator. The spiral coil pipe is connected to the vertical tubes of evaporator by passing through a first heat exchanger and a second heat exchanger. Further, the first storage tank is connected with a media filter of the second heat exchanger to remove Non Condensable Gases (NCG) from the tanks.

The first heat exchanger and the second heat exchanger are configured to pre-heat the industrial wastewater by heating the spiral coil pipe in two stages. The pre-heated industrial wastewater flows to the vertical tubes of the evaporator through the first control valve.

Further, a level measuring device is configured to monitor the level of industrial waste water. The level measuring device shuts the first control valve, once pre-heated waste water reaches the pre-determined level.

A pump comprises a pump inlet which is connected to the evacuation chamber through a second control valve. The second control valve pumps the water from the second storage tank for cooling the evaporator. The pump further comprises pump outlet, a part of pump outlet is connected to the shell outside of the vertical tubes of the evaporator and the other part of the pump outlet connected to the agitator of the evaporator. The pump outlet transfers the heat to the vertical tubes and thereby heating the waste water inside the vertical tubes.

In an embodiment, a plurality of IoT sensors are communicatively coupled to the industrial waste water recovery apparatus. The IoT sensors transfers process data from the apparatus to a cloud server through a IoT gateway. The user can monitor the data through the companion smartphone application. The user is notified with alerts if there any abnormalities detected.

Thus, the invention provides an industrial wastewater recovery apparatus aiming at Zero Liquid Discharge. The apparatus is low in cost, rigid and easy to operate. Further, the apparatus may be monitored in real time using IoT sensors. The system aids in water recovery and re-use of water as it is a depleting natural resource.

The user may receive or access industrial waste water recovery apparatus parameters from any electronic device having a processor and a memory. Hence it is easier to monitor the apparatus in real time using a smartphone or an electronic device. Thus, the industrial wastewater recovery is done in a simple and efficient manner.

BRIEF DESCRIPTION OF THE DRAWINGS

The foregoing and other features of embodiments will become more apparent from the following detailed description of embodiments when read in conjunction with the accompanying drawings. In the drawings, like reference numerals refer to like elements.

DETAILED DESCRIPTION OF THE INVENTION

Reference will now be made in detail to the description of the present subject matter, one or more examples of which are shown in figures. Each example is provided to explain the subject matter and not a limitation. Various changes and modifications obvious to one skilled in the art to which the invention pertains are deemed to be within the spirit, scope and contemplation of the invention.

The present invention provides an industrial wastewater recovery apparatus aiming at Zero Liquid Discharge (ZLD). The apparatus provides two stages in pre-heating the spiral coil pipe containing wastewater and also conserves the heat by using the two heat exchangers. The apparatus agitates the surface wastewater to increase the rate of evaporation for faster heating. The apparatus provides two stages in condensation of distilled water and also provides real-time monitoring of the water quality. The apparatus is easy to use and simple and is more suitable for applications in all kinds of industries.

Figure 1:
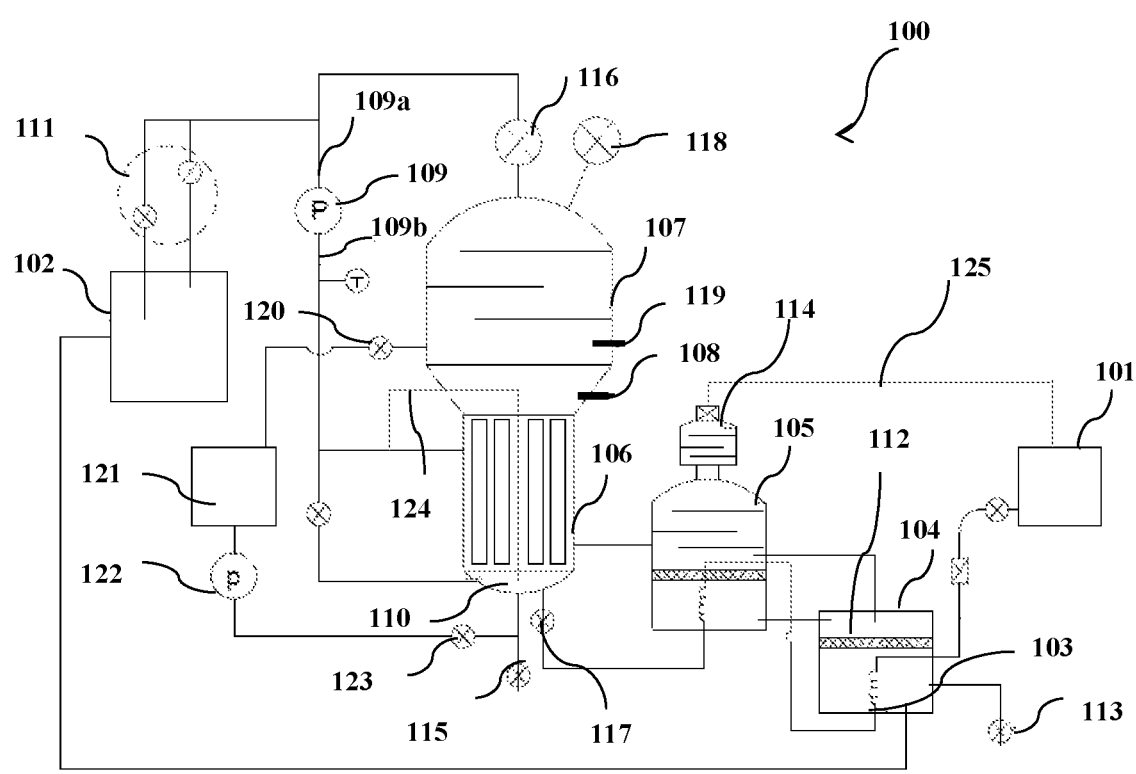
FIG. 1 shows a perspective view of the apparatus involved in recovering industrial wastewater, according to one embodiment of the invention.

FIG. 1 shows a perspective view of the apparatus involved in recovering industrial wastewater, according to one embodiment of the invention. The apparatus comprises of a first storage tank (101), a second storage tank (102), a spiral coil pipe (103), a first heat exchanger (104), a second heat exchanger (105), an evaporator having one or more vertical tubes (106), an evacuation chamber (107), a level measuring device (108), one or more control valves, a plurality of melding filters and a pump (109).

The industrial wastewater from the first storage tank (101) is allowed to flow towards the vertical tubes (106) of the evaporator through the spiral coil pipe (103). The spiral coil pipe (103) is connected to the vertical tubes (106) of evaporator by passing through the first heat exchanger (104) and the second heat exchanger (105). Further, the first storage tank (101) is connected to the second heat exchanger (105) which has a filter media (114) to let out the Non Condensable Gases (NCGs). The first heat exchanger (104) and the second heat exchanger (105) pre-heat the industrial wastewater by heating the spiral coil pipe (103) therein. Here, the industrial wastewater is pre-heated in two stages.

The pre-heated industrial wastewater flows to the vertical tubes (106) of the evaporator through the first control valve (117). The level measuring device (108) monitors the level of industrial wastewater in the evaporator and shuts the first control valve (117), once the pre-heated waste water reaches the pre-determined level.

The pump inlet (109a) is connected to the evacuation chamber (107) through a control valve (116). The second control valve (111) pumps the water from the second storage tank (102) for cooling the evaporator. The pump outlet (109b) is connected to the shell outside of the vertical tubes (106) of the evaporator. Simultaneously, the part of pump outlet (109b) is connected to the in-feed dish (110) of the evaporator. The part of pump outlet (109b) connection agitates and quickly heats up the wastewater by conduction heat transfer mechanism. Further an agitator line (124) is coupled to the vertical tubes of the evaporator.

The agitation increases the rate of evaporation in the wastewater for faster heating. The pump outlet (109b) transfers the heat to the vertical tubes (106) and thereby heating the wastewater inside the vertical tubes (106). The water evaporated from heating the vertical tubes (106) inside the evaporator is compressed to slightly above atmospheric pressure at the pump outlet (109b). Here, the pump outlet temperature is monitored automatically. The mass of the saturated steam is computed as a function of temperature.

If the mass of saturated steam is less, then the additional mass (in the form of water) is siphoned or tapped or pumped through the second control valve (111) from the second storage tank (102). The water to second storage tank (102) is being suctioned from the first heat exchanger (104). The first heat exchanger (104) contains the distilled water, which is obtained by condensing (2 stages of condensation) the steam at the outlet of pump (109b).

A foam sensor (119) detects the level of foam in the evaporator. Sensor may detect the foam at a certain level, the correct dose of anti-foaming agents may be automatically pumped in, creating an effective foam management system.

A cleaning agent in the Clean-in Place (CIP) tank (121) may be pumped through a CIPpump (122) and CIP inlet valve (123). Further, a CIP over flow valve (120) may detect the overflow of the cleaning agent and aid in re-circulation of the cleaning agent.

The pump outlet (109b) condenses and allows the water to flow towards the second heat exchanger (105) after heating the vertical tubes (106) thereby. The pump outlet (109b) may further condense and heat the spiral coil pipe (103) containing industrial wastewater. The condensed water in the first heat exchanger (104) and the second heat exchanger (105) go through the melding filters (112) to remove oil particles and further allow the condensed water to flow towards the first heat exchanger (104).

The first heat exchanger (104) further recovers the heat energy and heats the spiral coil pipe (103). The organic components present in the distilled water are filtered through the first melding filter (112) and thus enabling to collect the pure distilled water through the fourth control valve (113). The a Non Condensable Gases (NCG) in the first heat exchanger (104) and the second heat exchanger (105) are liberated to the atmosphere the through a filter media (114).

The distilled water is drained through the fourth control valve (113) for further uses. The water quality is monitored based on real time basis. Further, the wastewater stored in the first storage is passed through a filter before entering the evaporation chamber. Once the evaporation process is done, the draining process is initiated by sixth control valve (116) and first control valve (117). The fifth control valve (118) for letting in fresh air, the residue is drained through the sixth control valve (115). Here, the entire process is automated. The apparatus is easy to use and simple and is more suitable for applications in all kinds of industries.

Figure 2:
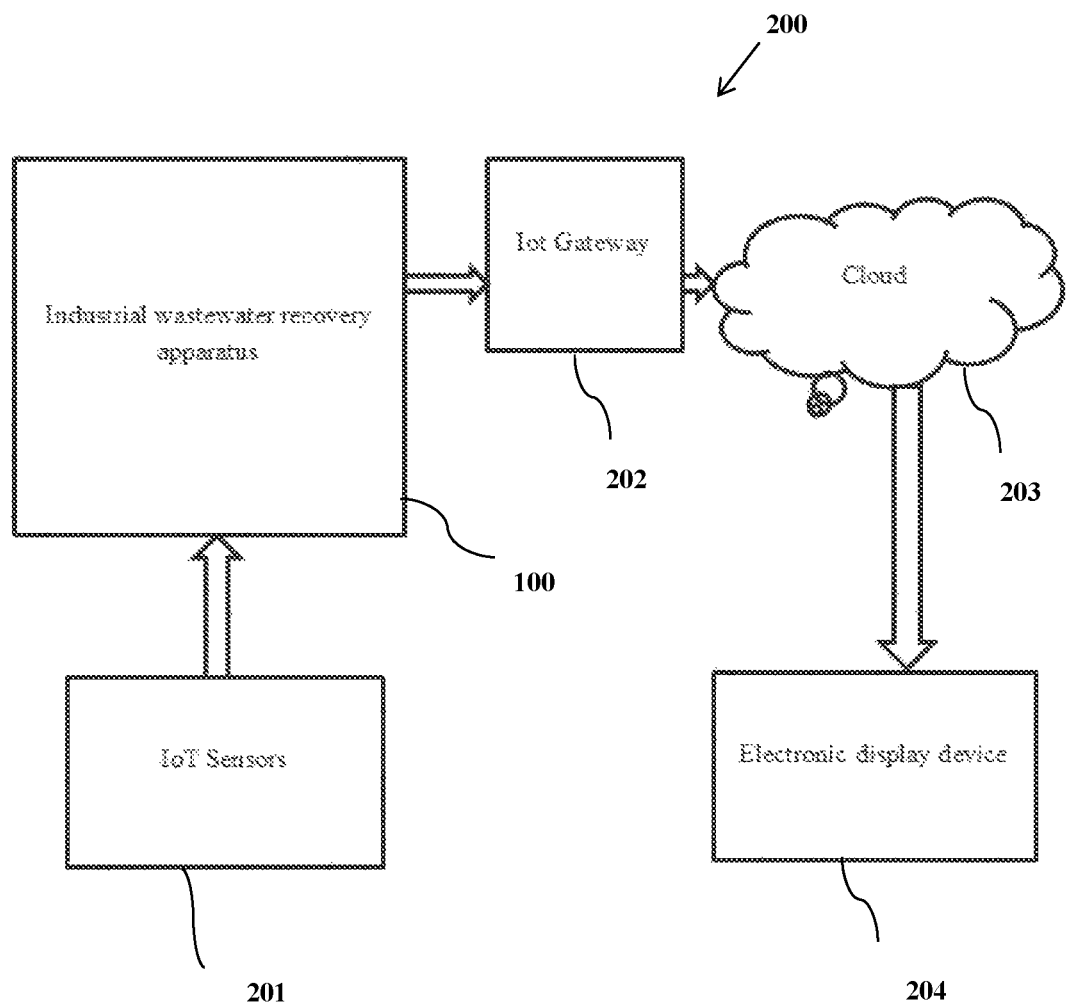
FIG. 2 illustrates a block diagram of monitoring the industrial waste water recovery apparatus by an IoT sensors.

FIG. 2 illustrates a block diagram of monitoring the industrial waste water recovery apparatus by an IoT sensors. In an embodiment of the invention, a plurality of IoT sensors (201) are communicatively coupled to the industrial waste water recovery apparatus (100). The plurality of IoT sensors (201) may collect, but not limited to temperature parameters, pressure parameters, components parameters etc. The collected data may be transmitted to IoT gateway (202). The transmission of data through one or more wireless network like but not limited to, local area network (LAN), a general wide area network (WAN), public network (e.g., the internet), wireless fidelity (Wi-Fi), Bluetooth, general packet radio service (GPRS), global system for mobile communication (GSM), personal area network (PAN), etc.

The aggregated data form the IoT gateway (202) is remotely stored in the server in a cloud database (203), either as a file or as a database entry, by any means of uploading the data through data transfer technologies from the group of, but not limited to, file transfer protocol (FTP), email, Hypertext transfer protocol (HTTP), asynchronous JavaScript and XML (AJAX), XML transfer, TCP/IP, etc. Data in the server will be updated on a continues basis as and when the data is available from the various IoT sensors (201).

The user may receive or access industrial waste water recovery apparatus (100) parameters from cloud database (203) by any electronic device (204) having a processor and a memory. The electronic device (204) may include, but not limited to a smartphone, mobile phone, computer, tablets, notebooks, digital hoardings, kiosks etc. The display will be generated either directly on the screens using various mechanisms or using display rendering schemes like those inside an application such as a browser or even a standalone application like on mobile phones.

Thus, the invention provides an industrial wastewater recovery apparatus aiming at Zero Liquid Discharge (ZLD). The apparatus is low in cost, rigid and easy to operate. Further, the apparatus may be monitored in real time using IoT sensors. The user may receive or access industrial waste water recovery apparatus parameters from any electronic device having a processor and a memory. Hence, it is easier to monitor the apparatus in real time using a smartphone or an electronic device. Thus, the industrial wastewater recovery is done in a simple and efficient manner.

It should be understood that various alterations, adjustments, changes and modifications to the presently preferred embodiments described herein will be apparent to those skilled in the art. Such changes and modifications may be made without departing from the spirit and scope of the present invention and without diminishing its attendant advantages. It is, therefore, intended that such alterations, adjustments, changes and modifications be covered by the appended claims.

We claim:

1. An apparatus for industrial waste water recovery aiming at Zero Liquid Discharge (ZLD), the apparatus comprising:
  a. a first storage tank (101) configured to allow the flow of industrial wastewater through a spiral coil pipe (103) towards vertical tubes (106) of an evaporator, wherein the spiral coil pipe (103) is connected to the vertical tubes (106) of the evaporator by passing through a first heat exchanger (104) and a second heat exchanger (105),
  wherein the first storage tank (101) is connected to the second heat exchanger (105) which has a filter media (114) to let out the non-condensable gases;
  b. the first heat exchanger (104) and the second heat exchanger (105) are configured to pre-heat the industrial wastewater by heating the spiral coil pipe (103) in two stages, wherein the pre-heated industrial wastewater flows to the vertical tubes (106) of the evaporator through a first control valve (117);
  c. a level measuring device (108) configured to monitor the level of industrial wastewater, wherein the level measuring device (108) shuts the first control valve (117), once pre-heated waste water reaches a pre-determined level;
  d. a pump (109) with a pump inlet (109a) connected to an evacuation chamber (107) through a second control valve (111), wherein the second control valve (111) pumps water from a second storage tank (102) for cooling the evaporator;
  e. the pump (109) comprises a pump outlet (109b) wherein a part of pump outlet (109h) is connected to a shell disposed outside of the vertical tubes (106) of the evaporator and the other part of the pump outlet is (109b) connected to an agitator (110) of the evaporator, wherein the pump outlet (109b) transfers heat to the vertical tubes (106) and thereby heating the wastewater inside the vertical tubes (106).

2. The apparatus (100) as claimed in claim 1, wherein the heat exchangers (104, 105) evaporate the wastewater in the vertical tubes (106).

3. The apparatus (100) as claimed in claim 1, wherein the first heat exchanger (104) contains the distilled water, which is obtained by condensing the steam at the outlet of pump (109b).

4. The apparatus (100) as claimed in claim 1, wherein the pump outlet (109b) condenses and heats the spiral coil pipe (103) containing industrial wastewater.

5. The apparatus (100) as claimed in claim 1, wherein the organic components present in distill water are filtered through a first melding filter (112) to collect the pure distilled water through the fourth control valve (113).

6. The apparatus (100) as claimed in claim 1, the NCG in the first heat exchanger (104) and the second heat exchanger (105) is liberated to the atmosphere through the filter media (114).

7. The apparatus (100) as claimed in claim 1, wherein condensed water in the first heat exchanger (104) and the second heat exchanger (105) go through melding filters (112) to remove oil particles and allows the condensed water to flow towards the first heat exchanger (104).

8. The apparatus (100) as claimed in claim 1, wherein an additional mass in the form of water is siphoned or tapped or pumped through the second control valve (111) from the second storage tank (102), in case the mass of saturated steam is less.

9. The apparatus (100) as claimed in claim 1, wherein a foam sensor (119) detects the level of foam in the evaporator.

10. The apparatus (100) as claimed in claim 1, wherein a cleaning agent in a Clean-in Place (CIP) tank (121) is pumped through a CIP pump (122) and CIP inlet valve (123).

* * * * *